(12) United States Patent
Scarlatti et al.

(10) Patent No.: US 9,551,989 B2
(45) Date of Patent: Jan. 24, 2017

(54) METHOD AND APPARATUS FOR EXTENDING THE OPERATION OF AN UNMANNED AERIAL VEHICLE

(71) Applicant: The Boeing Company, Chicago, IL (US)

(72) Inventors: David Scarlatti, Madrid (ES); David Esteban Campillo, Madrid (ES); Enrique Juan Casado Magana, Madrid (ES)

(73) Assignee: The Boeing Company, Chicago, IL (US)

( * ) Notice: Subject to any disclaimer, the term of this patent is extended or adjusted under 35 U.S.C. 154(b) by 381 days.

(21) Appl. No.: 13/871,825

(22) Filed: Apr. 26, 2013

(65) Prior Publication Data
US 2014/0129059 A1 May 8, 2014

(30) Foreign Application Priority Data
May 17, 2012 (EP) ..................................... 12382181

(51) Int. Cl.
*G05D 1/00* (2006.01)
*B64C 39/02* (2006.01)

(52) U.S. Cl.
CPC ............... *G05D 1/00* (2013.01); *B64C 39/024* (2013.01); *B64C 2201/027* (2013.01); *B64C 2201/042* (2013.01); *B64C 2201/06* (2013.01)

(58) Field of Classification Search
CPC .................................. G05D 1/00; B64C 39/024
See application file for complete search history.

(56) References Cited

U.S. PATENT DOCUMENTS

2011/0251935 A1* 10/2011 German et al. .................. 705/30
2011/0307126 A1* 12/2011 Hogstrom ........................ 701/16
2012/0091260 A1*  4/2012 Callou ........................ 244/17.13

* cited by examiner

*Primary Examiner* — Basil T Jos
(74) *Attorney, Agent, or Firm* — Toler Law Group, P.c.

(57) ABSTRACT

A method of extending the operation of an unmanned aerial vehicle (UAV) is disclosed. The method comprises detecting that an energy storage device on board the UAV is depleted below a threshold level, landing the UAV at a base station, and initiating operation of the base station to cause a replacement mechanism thereof to remove the energy storage device on board the UAV from the UAV and to replace this with another energy storage device.

20 Claims, 3 Drawing Sheets

METHOD AND APPARATUS FOR EXTENDING THE OPERATION OF AN UNMANNED AERIAL VEHICLE

RELATED APPLICATIONS

This application claims the right of priority under 35 U.S.C. §119 to patent application no. EP12382181 filed May 17, 2012, in the European Patent Office, the disclosure of which is incorporated herein by reference in its entirety.

BACKGROUND

This invention relates to a method of extending the operation of an unmanned aerial vehicle (UAV). In other aspects, this invention relates to a UAV, a base station for a UAV and command-and-control device for a UAV.

UAVs are increasingly being used in civilian applications. Many "blue light" services such as the police services and fire-fighting services now use UAVs for intelligence-gathering operations, such as to provide real-time video images of locations that are difficult or dangerous to attend in person. UAVs are often able to provide such images quickly, conveniently and inexpensively. The UAVs used in such applications are relatively small compared to UAVs used, for example, in military strike operations. These smaller UAVs are often battery powered. This has the advantage of reducing complexity and cost. An example of such a UAV is the AR.Drone offered by Parrot.

A problem that exists with such smaller UAVs is that their operational duration is limited by their batteries. It is typical for such UAVs to be able to fly for no longer than 15 to 20 minutes before the battery becomes depleted. This is the principal limitation on the use of such devices.

Attempts have been made to improve the performance of batteries and so address this problem. For example, battery lives have been improved, charging times have been reduced and the energy consumption of UAVs has also been reduced. Despite these improvements this problem of limited endurance persists.

There therefore remains a need to address this problem.

SUMMARY

Embodiments of the present invention take a different approach from that taken previously. Rather than look at improving batteries, charging times or the power consumption of UAVs, the present approach is to provide an arrangement for the rapid replacement of batteries, or other energy storage devices, on UAVs such that effective operational duration can be extended.

According to a first aspect of this invention, there is provided a method of extending the operation of an unmanned aerial vehicle (UAV), the method comprising the steps of detecting that an energy storage device on board the UAV is depleted below a threshold level, landing the UAV at a base station, and initiating operation of a base station to cause a replacement mechanism thereof to remove the storage device on board the UAV from the UAV and to replace this with another storage device.

The method may further comprise the step of operating the base station to detect the position of the UAV relative to the base station when landed. This may include operating sensors at the base station to sense the position of the UAV. Sensing the position may include sensing the orientation of the UAV. Sensing the position may comprise operating pressure sensors positioned in and/or on a landing surface of the base station and/or optical sensors positioned in and/or on and/or around that surface. The surface may be a launch and recovery pad. Sensing the position may comprise generating information indicative of the position and/or orientation of the UAV.

The operation of the base station may comprise the replacement mechanism operating to take the other storage device from a store thereof. The operation of the base station may comprise operating the replacement mechanism using the detected position and/or orientation of the UAV to move replacement structure of the replacement mechanism to the UAV to remove the storage device therefrom. The operation of the base station may comprise operating the replacement mechanism using the information indicative of the sensed position and/or orientation of the UAV to move the replacement structure of the replacement mechanism to the UAV to couple the other storage device thereto. These steps may occur in the sequence in with they are recited herein; they may occur in another sequence.

The other storage device may not be depleted below the threshold. The store may be a charging station at which storage devices are replenished with energy such that their store thereof is above the threshold and such that the store of energy therein is substantially at a maximum. Each storage device may be a battery, a super capacitor, and/or a container of fuel.

The method may be carried out as a result of instructions executed by a processor on the UAV and/or a processor at the base station and/or a processor at a remote command-and-control device.

According to a second aspect of this invention, there is provided a UAV, the UAV arranged to carry out one, more or all of the steps of the method of the first aspect.

According to a third aspect of this invention, there is provided a command-and-control device arranged to carry out one, more or all of the steps of the method of the first aspect. The command-and-control device may comprise computer processing means. For example, it may comprise a computer such as a portable computer. Non exhaustive examples of a portable computer comprise a laptop, a tablet PC and a smartphone.

According to a fourth aspect of this invention, there is provided a base station arranged to carry out one, more of all of the steps of the method of the first aspect. The base station may be arranged as defined hereinabove.

The base station may comprise the replacement mechanism at the base station to remove the storage device on board the UAV from the UAV and replace this with another storage device. The base station may comprise the sensors to sense the position of the UAV. The replacement mechanism may comprise the replacement structure to remove the storage device from the UAV. The replacement mechanism may comprise a robot arm arranged to remove and/or fit storage device to and/or from the UAV. The base station may comprise the store of energy storage devices. The base station may comprise the landing surface.

Features of the first aspect may also be features of each other aspect.

Operation of the UAV may be controlled as a result of instructions executed by a processor on the UAV and/or a processor at the remote command-and-control device. Operation of the base station may be controlled by a processor at the base station and/or by a processor at the UAV and/or by a processor at the remote command-and-control device.

One, more or all steps may happen automatically subsequent to it being detected that the energy storage device on board the UAV is depleted below a threshold level According to a fifth aspect of this invention, there is provided a record carrier comprising processor-executable instructions to cause a processor to carry out a method according to the first aspect.

The record carrier may comprise solid state storage means, such as, for example, a ROM, EPROM and/or EEPROM. The record carrier may comprise optical and/or magnetic storage means, such as, for example, a CD-ROM, DVD-ROM and/or magnetic storage disk. The record carrier may comprise a signal such as an electrical, optical and/or wireless signal.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

Examples of methods and systems in accordance with the teachings of the present disclosure are described in detail below with reference to the following drawings.

DETAILED DESCRIPTION

Figure 1:
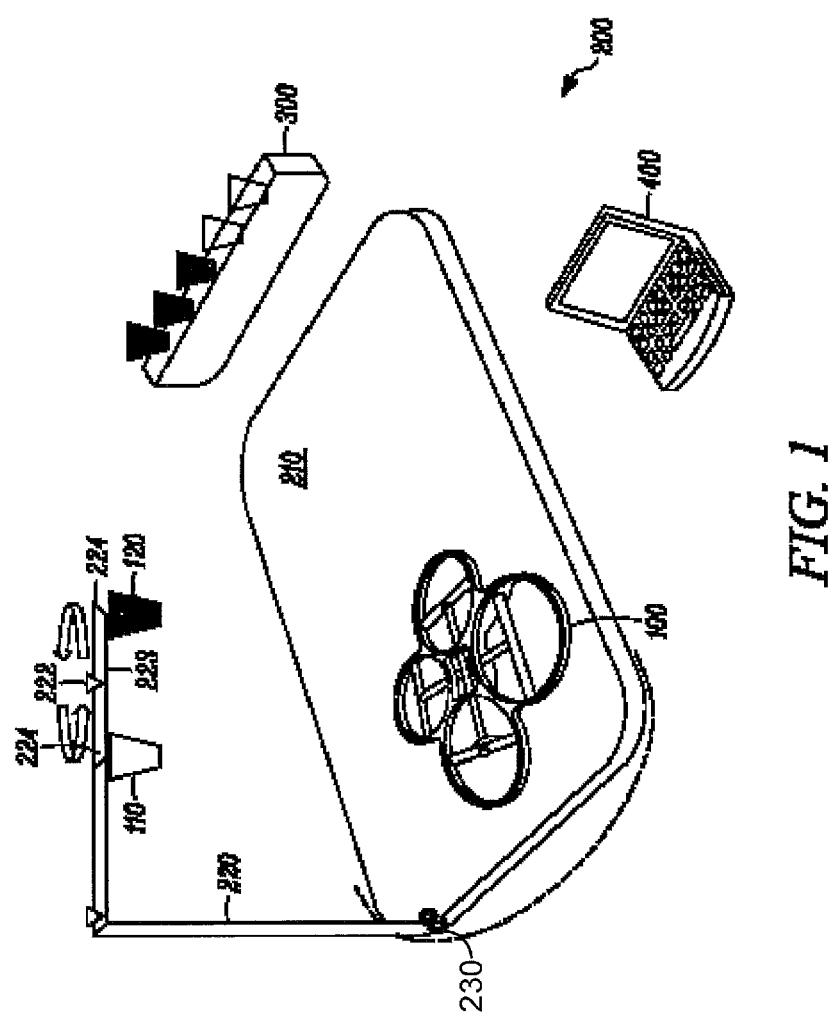
FIG. 1 shows in schematic form a UAV, a base station and a command-and-control station.

FIG. 1 shows in schematic form an overview of a UAV 100, a base station 200 that includes a charging station 300, and a command-and-control (C2) station 400.

In this embodiment, the UAV 100 is an existing UAV, such as the AR.Drone provided by Parrot. It is a battery-powered quad-rotor UAV that is able to communicate wirelessly with the C2 station 400. The wireless communication is such that the UAV can receive commands from the C2 station 400 that control operation of the UAV 100, and can send information about operation of the UAV 100 to the C2 station 400. The UAV 100 has an energy storage device in the form of a removable and rechargeable battery 110.

The C2 station 400 is, in this embodiment, a laptop that communicates wirelessly with the UAV 100 using a radio. The C2 station 400 communicates using WiFi. In other embodiments, other forms of wireless communication are envisaged.

The base station 200 takes the form of a launch and recovery pad 210 on which the UAV 100 can land and from which it can take off. The pad 210 is arranged with sensors (not shown) to sense the position and orientation of the UAV 100 when the UAV 100 is on the pad 210. In this embodiment, this is done by the provision of pressure sensors embedded within the pad 210 that are responsive to the weight of the UAV 100 to produce a signal indicative of the position of the UAV 210 on the pad. Optical sensors are also provided on and around the pad 210 to provide a signal indicative of the position and orientation of the UAV 100 when positioned on the pad 210. Signals produced by the sensors are fed to a control unit (not shown) of the base station 200. The control unit includes a microprocessor and a record of software executable by the microprocessor to cause it to operate the base station 200 in the manner described herein. The control unit is operable to ascertain, from the signals produced by the sensors, the position and orientation of the UAV 100 on the pad 210.

Also forming part of the base station 200 is a robot arm 220. The robot arm 220 is arranged to access the UAV 100 wherever the UAV 100 is positioned on the pad 210. In this embodiment, this is accomplished by the robot arm 220 having wheels 230 that allow the robot arm, under the control of the control unit, to move over the pad 210. Movement of the robot arm 220 is further provided for by it being articulated such that sections of the arm 220 are pivotable relative to other sections of the arm 220. One such pivot is shown at 222. A battery replacement section 223 of the arm 220 is provided with two battery engagement portions 224. Each portion is provided with selectively operable magnetic contacts that are operable to releasably engage a battery when adjacent to a battery, such that the battery is grasped by the engagement portion 224 for lifting, moving and subsequently releasing. In other embodiments, other forms of engagement, such as a pincer arrangement, are envisaged. The battery-replacement section 223 is pivotally mounted adjacent its centre to the remainder of the robot arm 220 such that the relative positions of each of the two engagement portions 224 can be swapped by rotating the replacement section 223 180 degrees about its pivot. The purpose of this will become clear.

Again, operation of the robot arm 220, including the battery-replacement section 223 and the engagement portions 224 is under the control of the control unit of the base station 200.

The charging station 300 forms part of the base station 200. The purpose of the charging station 300 is to hold batteries for charging and to receive depleted batteries from, and make recharged batteries available to, the robot arm 20. Accordingly, the charging station 300 is arranged to hold multiple batteries (in this embodiment five are envisaged) and to charge each one from a depleted state to a state of maximum charge. The charging station is positioned within reach of the robot arm 220 such that the robot arm 220 can deposit for charging at the charging station 300 a depleted battery that has been removed from the UAV 100 and can collect from the charging station 300 a recharged battery for fitting to the UAV 100. The charging station 300 also operates under the control of the control unit of the base station 200.

The control unit of the base station 200 also has a wireless communication unit to communicate wirelessly, again in this embodiment by using WiFi, with the C2 station 400.

The C2 station 400 takes the form of, in this embodiment, a laptop computer. The computer is able to communicate wirelessly, in the manner previously described, with each of the control unit of the base station 200 and the UAV 100. The C2 station 400 runs software that controls operation of both the UAV 100 and the base station 200. In other embodiments, however, it is envisaged that the base station 200 may control its own operation in response to the software running thereon and in response to signals from the UAV 100 and/or detecting that the UAV 100 has landed on the pad 210.

Operation of the various components will now be described with reference to the flowchart of FIG. 2.

Figure 2:
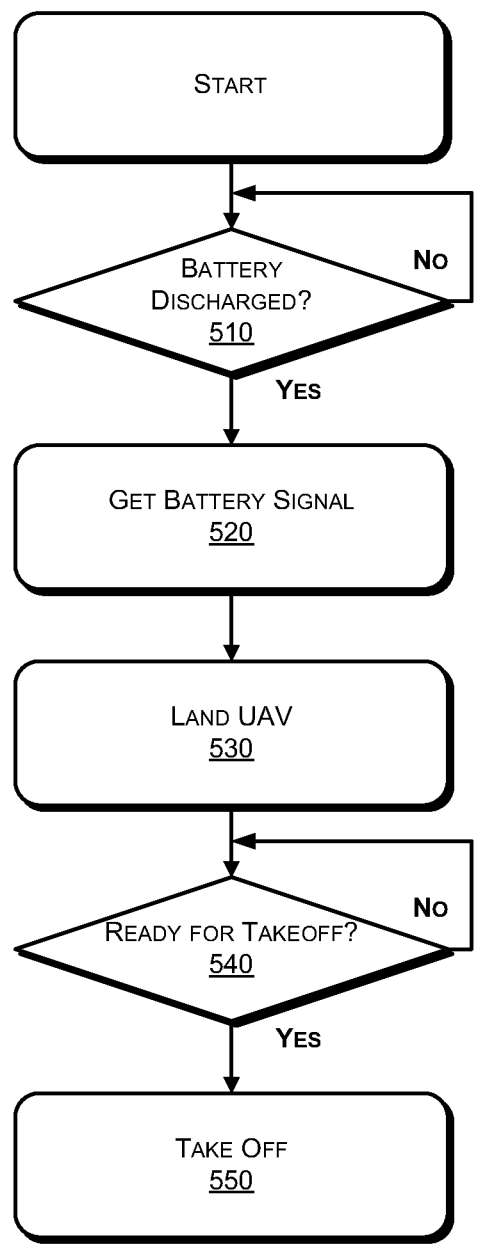
FIG. 2 shows a flowchart illustrating the method of operation of the command-and-control station shown in FIG. 1.

FIG. 2 shows the method of operation 500 of the C2 station 400. This method 500 is a subroutine that is executed during normal operation of the UAV 10 under the control of the C2 station 400 when the C2 station detects at a first step 510 that the battery 110 of the UAV is discharged below a threshold value such that it is determined that the battery 110 should be replaced.

Upon determining at step 510 that the battery 110 should be replaced, the method 500 proceeds to step 520 at which the C2 station 400 sends a signal to the base station 200 that the robot arm 220 should retrieve a fully charged battery 120 from the charging station 300. The method 500 being run by the C2 station then proceeds to step 530 at which the C2 station 400 controls the UAV 100 to land on the launch and recovery pad 210 of the base station 200.

The method 500 being run by the C2 station 400 then waits at step 540 for a signal from the base station 200 that the UAV 100 has been fitted with the new battery 120 and is ready for takeoff.

Figure 3:
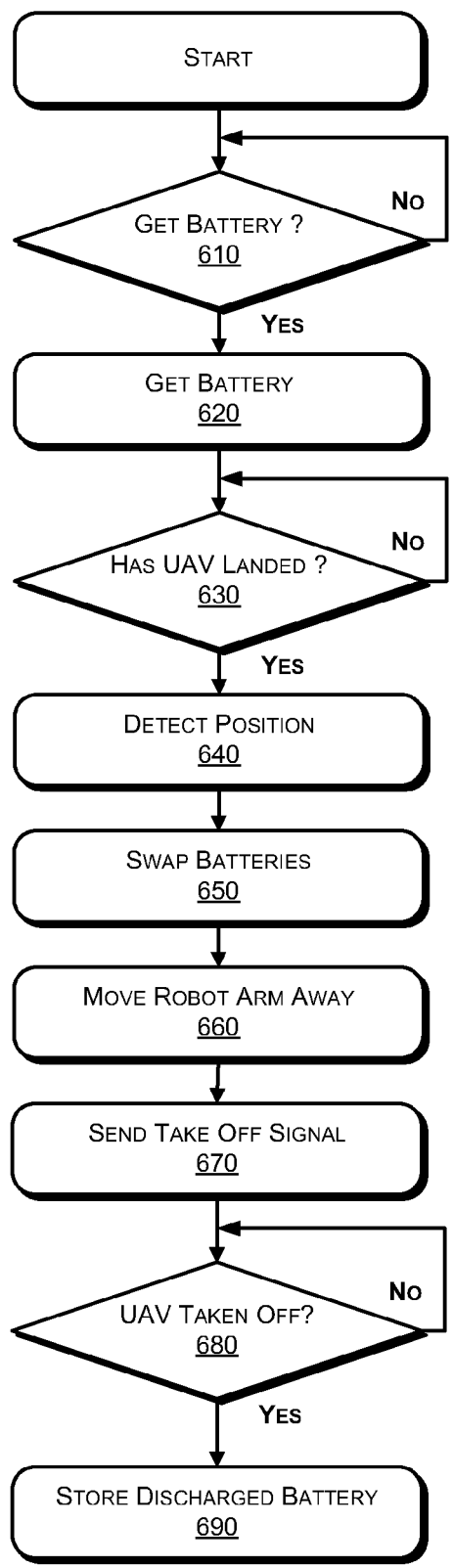
FIG. 3 shows a flowchart illustrating the method of operation of the base station shown in FIG. 1.

In the meantime, the method 600 runs on the base station 200. This is in the form of software being executed by the control unit of the base station 200 and is shown in FIG. 3. The method 600 is initiated at a first step 610 when the base station 200 receives the signal from the C2 station 400 that the robot arm 220 should retrieve the fully charged battery 110 from the charging station 300.

Upon receiving this signal, the method 600 running on the base station 200 proceeds to step 620 at which the control unit of the base station 200 controls the robot arm to move to the charging station 300. When the robot arm is at the charging station 300, the magnetic contacts of the engagement portion 224 that is currently positioned at the end of the robot arm 220 are operated to pick up the fully charged battery 120. The robot arm 220 is then operated to rotate the battery replacement section 223 180 degrees about its pivot such that the other, empty, engagement portion 224 is at the end of the arm 220.

The method of the base station 600 then moves on to step 630 at which the base station detects whether or not the UAV 100 has landed on the pad 210. This is done by sensing the signals from the pressure sensors in the pad 210 and the optical sensors in and around the pad 210. When it is detected that the UAV 100 has landed on the pad, the signals from the sensors are used at step 640 to determine the position and orientation of the UAV 100 on the pad 210.

Once this is done, the robot arm 220 is operated at step 650 to move to the determined position of the UAV 100 and to operate the currently empty engagement portion 224 that is at the end of the arm 220 to energise the magnetic contacts and pick up the discharged battery 110 from the UAV. The battery replacement section 223 of the robot arm 220 is then rotated 180 degrees about its pivot to swap the positions of the discharged battery 110 and the fully charged battery 120. In this way, the fully charged battery 120 is now positioned adjacent the UAV 100. The fully charged battery 120 is then dropped into placed in the UAV 100 by de-energising the magnetic contacts of the relevant battery engagement portion 224.

The method then proceeds to step 660 at which the robot arm is moved into a position in which it projects outside and away from the pad 210 so as not to obstruct take off of the UAV 100. Once this is done, the base station 200 sends a signal at step 670 to the C2 station 400 that the batteries 110, 120 have been swapped and the UAV 100 is ready to resume operation.

The method 600 running on the base station 200 then waits at step 680 until it is detected, by way of the sensors, that the UAV has left the pad 210. Once it has been determined that the UAV has left the pad 210 the robot arm 220 is operated to drop off the discharged battery 110 at the charging station 300 for recharging. The method 600 then returns to step 610 to wait for another signal that it should pick up another fully charged battery.

Returning now to the method 500 running on the C2 station, that method had been waiting at step 540 for a signal that the UAV's discharged battery 110 had been swapped for a fully charged battery 120 and is ready to resume operation. As mentioned, this signal is sent from the base station 200 at step 670 of the method running on the base station 200. Upon receiving this signal, the C2 station 400 proceeds to step 550 at which it controls the UAV 100 to take off for resumed operation. The subroutine then returns to the first step 510 to wait for the new battery 120 to become discharged and run the method again.

In this way, a discharged battery on the UAV is quickly, conveniently and repeatedly swapped for a fully charged battery, thereby prolonging the effective operating duration of the UAV 100 to be many times its normal operating duration.

In the foregoing discussion, specific implementations of exemplary processes have been described, however, it should be understood that in alternate implementation, certain acts need not be performed in the order described above. In alternate examples, some acts may be modified, performed in a different order, or may be omitted entirely, depending on the circumstances. Moreover, in various alternate implementations, the acts described may be implemented by a computer, controller, processor, programmable device, firmware, or any other suitable device, and may be based on instructions stored on one or more computer-readable media or otherwise stored or programmed into such devices (e.g. including transmitting computer-readable instructions in real time to such devices). In the context of software, the acts described above may represent computer instructions that, when executed by one or more processors, perform the recited operations. In the event that computer-readable media are used, the computer-readable media can be any available media that can be accessed by a device to implement the instructions stored thereon.

While various examples have been described, those skilled in the art will recognize modifications or variations which might be made without departing from the present disclosure. The examples illustrate the various aspects of the disclosure and are not intended to limit the present disclosure. Therefore, the description and claims should be interpreted liberally with only such limitation as is necessary in view of the pertinent prior art.

What is claimed is:

1. A method comprising:
    determining a position of an unmanned aerial vehicle (UAV) on a landing pad of a base station after the UAV has landed on the landing pad, the position determined via a surface sensor coupled to the landing pad;
    removing an energy storage device on board the UAV from the UAV using a replacement mechanism of the base station based on the position; and
    coupling a second energy storage device to the UAV using the replacement mechanism based on the position.

2. The method of claim 1, wherein the surface sensor includes a pressure sensor.

3. The method of claim 1, further comprising determining an orientation of the UAV on the landing pad via the surface sensor.

4. The method of claim 3, wherein removing the energy storage device comprises moving a portion of the replacement mechanism to the position and rotating the portion of the replacement mechanism based on the orientation.

5. The method of claim 4, wherein coupling the second energy storage device comprises rotating the portion of the replacement mechanism so that the second energy storage device corresponds with the position and the orientation.

6. The method of claim 1, further comprising taking the second energy storage device from a charging station with the replacement mechanism.

7. The method of claim 1, wherein the replacement mechanism has a first energy storage device receptacle and a second energy storage device receptacle, wherein the first energy storage device receptacle is configured to couple to the energy storage device, wherein the second energy storage device receptacle is configured to couple to the second energy storage device, and further comprising swapping locations of the first energy storage device receptacle and the second energy storage device receptacle after removing the energy storage device.

8. The method of claim 7, wherein a portion of the replacement mechanism is rotated about a pivot to swap locations of the first energy storage device receptacle and the second energy storage device receptacle.

9. The method of claim 1, wherein the replacement mechanism deposits the energy storage device in a charging station.

10. A non-transitory computer-readable medium comprising processor-executable instructions, that when executed by a processor, cause the processor to perform operations comprising:
   determining a position of an unmanned aerial vehicle (UAV) on a landing pad of a base station after the UAV has landed on the landing pad, the position determined via a surface sensor coupled to the landing pad;
   initiating a replacement mechanism to remove an energy storage device on board the UAV from the UAV based on the position; and
   initiating the replacement mechanism to couple a second energy storage device to the UAV using the replacement mechanism based on the position.

11. The non-transitory computer-readable medium of claim 10, wherein the operations further comprise:
   receiving a signal from a command and control station indicating that the energy storage device is depleted below a threshold level before determining the position; and
   initiating the replacement mechanism to retrieve the second energy storage device from a recharging station in response to the signal.

12. The non-transitory computer-readable medium of claim 11, wherein the command and control station provides commands to the UAV to land on the landing pad of the base station.

13. The non-transitory computer-readable medium of claim 11, wherein the operations further comprise transmitting a second signal to the command and control station in response to the second energy storage device being coupled to the UAV, wherein the second signal indicates that second energy storage device is coupled to the UAV.

14. The non-transitory computer-readable medium of claim 11, wherein the operations further comprise coupling the energy storage device to the recharging station in response to the UAV taking off from the landing pad.

15. An apparatus comprising:
   a landing pad;
   a surface sensor coupled to the landing pad;
   a replacement mechanism coupled to the landing pad;
   a processor communicatively coupled to the replacement mechanism; and
   a computer readable storage device comprising processor-executable instructions, that when executed by the processor, cause the processor to perform operations comprising:
      determining a position of an unmanned aerial vehicle (UAV) on the landing pad after the UAV has landed on the landing pad, the position determined via the surface sensor;
      initiating the replacement mechanism to remove an energy storage device on board the UAV from the UAV based on the position; and
      initiating the replacement mechanism to couple a second energy storage device to the UAV using the replacement mechanism based on the position.

16. The apparatus of claim 15, wherein the surface sensor includes an optical sensor embedded in a surface of the landing pad.

17. The apparatus of claim 15, wherein the replacement mechanism comprises a pivotable section that rotates around a pivot point, wherein a first end of the pivotable section comprises a first connector configured to remove the energy storage device, and wherein a second end of the pivotable section comprises a second connector configured to couple the second energy storage device.

18. The apparatus of claim 17, wherein the operations further comprise initiating rotation of the pivotable section so that the second connector is in a location that the first connector was previously in after the energy storage device is removed.

19. The apparatus of claim 15, further comprising a recharge station coupled to the landing pad.

20. The apparatus of claim 19, wherein the operations further include initiating the replacement mechanism to insert the energy storage device into the recharge station.

* * * * *